Patented Apr. 11, 1933                                                    1,903,443

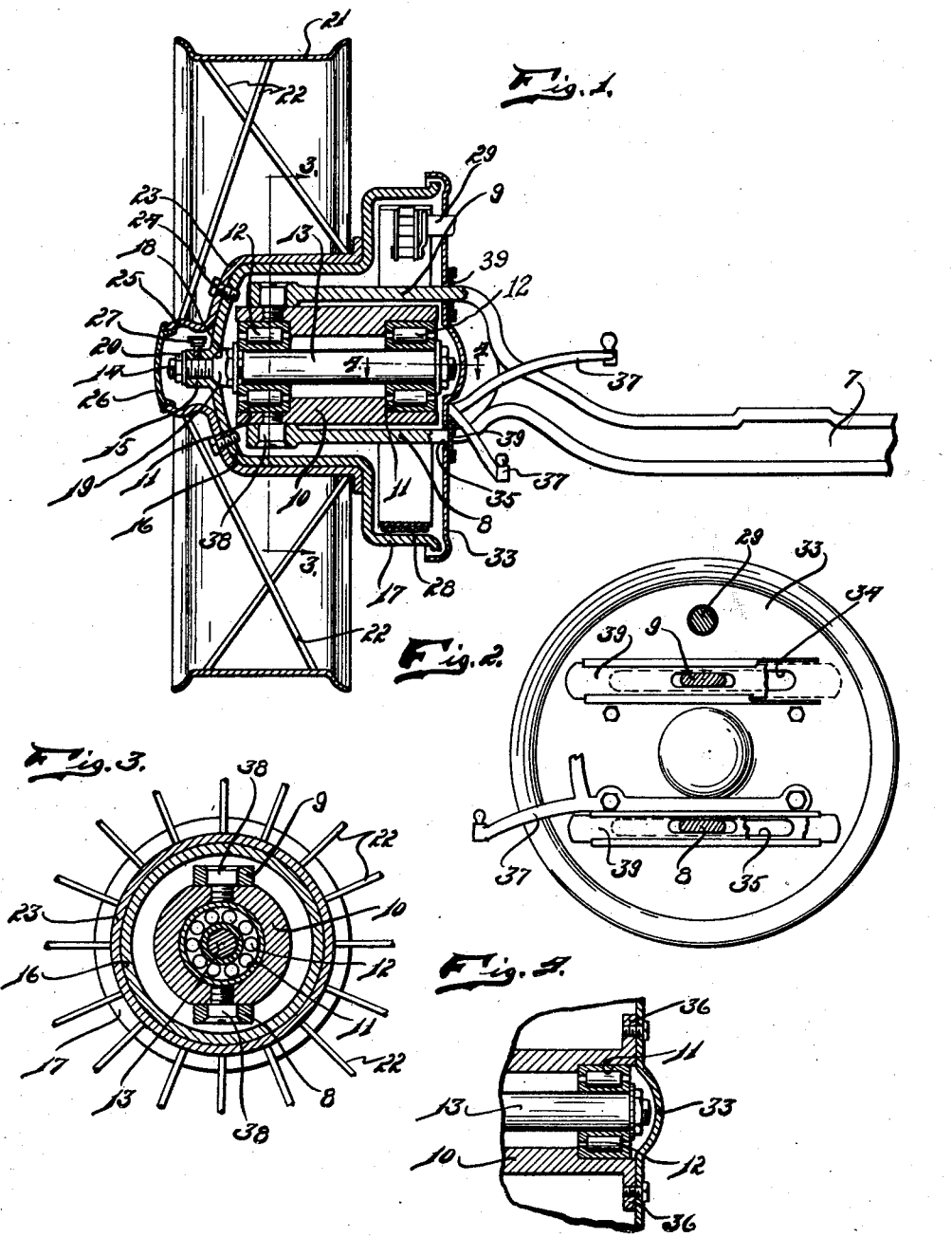

UNITED STATES PATENT OFFICE

JOSEPH DRZEWIECKI, OF DETROIT, MICHIGAN

VEHICLE WHEEL AND MOUNTING THEREFOR

Application filed February 20, 1930. Serial No. 429,899.

My invention relates to a new and useful improvement in a vehicle wheel and mountings therefor and has for its object the provision of a vehicle wheel and mounting which, when supported on an axle, will be capable of angular movement relatively thereto and yet held rigid and firm in all positions thus eliminating "shimmying" and rendering the riding of the vehicle easy and smooth as well as of increased safety.

Another object of the invention is the provision of a mechanism of this class which will be simple in structure, economical of manufacture, easily and quickly assembled, durable, and highly efficient in use.

Other objects will appear hereinafter.

The invention consists in the combination and arrangement of parts hereinafter described and claimed.

The invention will be best understood by a reference to the accompanying drawing which forms a part of this specification and in which, Fig. 1 is a central vertical sectional view of the invention showing it assembled.

Fig. 2 is a view taken on line 2—2 of Fig. 1.

Fig. 3 is a view taken on line 3—3 of Fig. 1.

Fig. 4 is a view taken on line 4—4 of Fig. 1.

The invention is primarily adapted for use in mounting those wheels which are angularly movable relatively to the axle on which carried to effect the steering of the vehicle. In the drawing I have illustrated the invention used with an axle 7 having at its ends the spaced forks 8 and 9 to which is secured a cylindrical sleeve 10 cut away at its opposite ends as at 11 to accommodate the roller bearing 12 in which is journaled the spindle or wheel supporting shaft 13. A threaded reduced portion 14 is formed on the spindle or shaft 13 and projected into a neck 15 extending outwardly from the cup shaped support 16 which is provided with the outwardly pressed brake-drum forming portion 17. A counter-sink 18 is formed in the inner surface of the base of the cup shaped member 16 to accommodate the taper 19 of the spindle 13 so that when the nut 20 is threaded on the threaded portion 14 the cup shaped member, through engagement with the taper 19 in the countersink 18, will be rotatably fixed relatively to the spindle 13.

The wheel comprises the rim 21 connected by the spokes 22 to the hub 23 which is formed cup shaped and of a contour to conform to the contour of the support 16. Bolts 24 serve to bind the hub on the wheel support 16. A neck 25 is projected outwardly from the hub and provided with a closure or cap 26, upon removal of which access to the nut 20 may be had. A grease cup 27 is also provided within the neck 25. Positioned within the brake-drum is the brake band 28 operable by suitable brake band mechanism designated generally herein by the reference character 29. A cover plate 33 is provided with the slots 34 and 35 in which may ride the forks 8 and 9, this cover plate being secured to laterally extended arms 36 formed on the sleeve 10. Secured to the cover plate is the usual steering knuckle 37. The sleeve 10 is, of course, rockable relatively to the forks 8 and 9 on the screws 38, which bind the forks to the sleeve.

Mounted on the forks 8 and 9 and slidable relatively to the cover plate 33 so as to cover the slots 34 and 35 and prevent entry of dust into the housing provided by the hub supporting member and cover plate are guard plates 39.

With a device constructed in this manner, the engagement of the forks of the axle with the wheel mounting are well inwardly of the wheel; thus so centering the point of attachment as to prevent undue vibration, and so forth.

While I have illustrated and described the preferred form of my invention, I do not wish to limit myself to the precise details of structure shown but desire to avail myself of such variations and modifications as may come within the scope of the appended claims.

Having thus described my invention, what I claim as new and desire to secure by Letters Patent is:

1. A wheel and axle unit of the class described comprising, a wheel assembly having brake mechanism of the internal expanding type including a brake drum formed with an axially extending reduced hub portion, a backing plate cooperating with the drum to enclose portions of the brake mechanism, an axle having a forked end projecting through elongated slots in the backing plate and extending into the reduced hub portion aforesaid of the drum, a spindle extending axially of the wheel assembly intermediate the furcations of the forked end of the axle and having the outer end secured to the wheel assembly, means for swivelly connecting the wheel assembly to the forked end of the axle including a sleeve journaled upon said spindle between the furcations aforesaid, and means for pivotally connecting the ends of the furcations to the forward end of the sleeve.

2. A wheel and axle unit of the class described comprising, a wheel assembly having brake mechanism of the internal expanding type including a brake drum provided with an axially outwardly extending reduced hub portion, a backing plate cooperating with the drum to enclose portions of the brake mechanism, an axle having a bifurcated end arranged with the furcations thereof projecting through elongated slots in the backing plate and extending into the hub portion aforesaid of the drum, a spindle arranged axially of the wheel assembly between the furcations and having the forward end secured to the wheel assembly, means for swivelly connecting the wheel assembly to the axle including a sleeve journaled upon the spindle between the furcations and having the inner end thereof secured to the backing plate, and means for pivotally connecting the forward end of the sleeve to the corresponding ends of the furcations.

3. A wheel and axle unit of the class described comprising, a wheel assembly having a hub section and a brake drum formed with an outwardly extending reduced hub portion embracing the hub of the wheel assembly, brake mechanism located within the drum, a backing plate cooperating with the drum to enclose the brake mechanism, an axle having a bifurcated end portion arranged with the furcations thereof extending through elongated slots in the backing plate and extending into the reduced hub portion of the drum, closure members for the slots in the backing plate slidably mounted upon the latter, a spindle extending axially of the hub portion of the drum and having the forward end thereof anchored within the said hub portion, a sleeve journaled upon the spindle and having the rear end thereof rigidly secured to the backing plate, and means for swivelly connecting the sleeve to the furcations aforesaid including pins arranged transverse to the axis of rotation of the wheel assembly and disposed within the central plane of rotation of the wheel assembly.

4. A brake drum and wheel unit of the class described comprising, a wheel assembly having brake mechanism of the internal expanding type including a brake drum formed with an axially extending reduced hub portion, a backing plate cooperating with the drum to enclose portions of the brake mechanism, an axle having a forked end portion extending into the reduced hub portion aforesaid of the drum through slots formed in the backing plate elongated in a direction to permit movement of the backing plate relative to the axle, a spindle fixed to the wheel assembly and concentrically arranged with respect to the hub portion on the brake drum between the furcations of the forked end of the axle, a sleeve journaled upon the spindle aforesaid, and means pivotally connecting the furcations and sleeve including a pin having its axis arranged in the plane of rotation of the wheel.

In testimony whereof I have signed the foregoing specification.

JOSEPH DRZEWIECKI.